US011954235B1

(12) United States Patent
Lee et al.

(10) Patent No.: US 11,954,235 B1
(45) Date of Patent: *Apr. 9, 2024

(54) ONE-WAY COMMUNICATION DATA DIODE ON A CHIP

(71) Applicant: Fend Incorporated, Arlington, VA (US)

(72) Inventors: Sang Cheon Lee, Ashburn, VA (US); Colin Patrick Dunn, Falls Church, VA (US)

(73) Assignee: Fend Incorporated, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,484

(22) Filed: Jun. 12, 2023

Related U.S. Application Data

(63) Continuation of application No. 18/068,316, filed on Dec. 19, 2022, now Pat. No. 11,709,970.

(51) Int. Cl.
G06F 21/71 (2013.01)
H05K 1/02 (2006.01)
H05K 1/18 (2006.01)

(52) U.S. Cl.
CPC .......... *G06F 21/71* (2013.01); *H05K 1/0213* (2013.01); *H05K 1/181* (2013.01); *H05K 2201/10121* (2013.01); *H05K 2201/10159* (2013.01); *H05K 2201/10174* (2013.01)

(58) Field of Classification Search
CPC ..................................................... G06F 21/71
See application file for complete search history.

(56) References Cited

U.S. PATENT DOCUMENTS

| 5,574,722 | A | 11/1996 | Slykhouse et al. |
| 5,703,562 | A | 12/1997 | Nilsen |
| 6,901,075 | B1 | 5/2005 | Baron |
| 7,675,867 | B1 | 3/2010 | Mraz et al. |
| 8,139,581 | B1 | 3/2012 | Mraz et al. |
| 8,223,205 | B2 | 7/2012 | Frenkel et al. |
| 9,264,288 | B1 | 2/2016 | Arora et al. |
| 9,305,189 | B2 | 4/2016 | Mraz et al. |
| 9,473,300 | B2 | 10/2016 | Coleman et al. |
| 9,917,442 | B2 | 3/2018 | Beauregard et al. |
| 9,961,108 | B2 | 5/2018 | Coleman et al. |

(Continued)

FOREIGN PATENT DOCUMENTS

| EP | 3229439 A1 | 10/2017 |
| EP | 3502911 A1 | 6/2019 |
| WO | 2014164976 A1 | 10/2014 |

OTHER PUBLICATIONS

PCT/US2022/053525 International Search Report, dated Sep. 8, 2023, 4 pages.

(Continued)

*Primary Examiner* — Viral S Lakhia
(74) *Attorney, Agent, or Firm* — Schafer IP Law; Richard A. Schafer

(57) ABSTRACT

A data diode chip provides a flexible device for collecting data from a data source and transmitting the data to a data destination using one-way data transmission. On-chip processing elements allow the data diode to identify automatically the type of connectivity provided to the data diode and configure the data diode to handle the identified type of connectivity.

20 Claims, 4 Drawing Sheets

(56) References Cited

U.S. PATENT DOCUMENTS

| | | | |
|---|---|---|---|
| 10,197,755 B1 * | 2/2019 | Merl | H04B 10/40 |
| 10,209,464 B2 * | 2/2019 | Pfnuer | G02F 1/011 |
| 10,270,745 B2 * | 4/2019 | Rotvold | H04W 12/088 |
| 10,389,817 B2 * | 8/2019 | Dahlstrom | G06F 9/4401 |
| 10,474,613 B1 | 11/2019 | Dunn et al. | |
| 10,515,234 B2 * | 12/2019 | Soffer | G06F 13/4022 |
| 10,530,811 B2 | 1/2020 | Black et al. | |
| 10,846,439 B2 | 11/2020 | Locatelli et al. | |
| 10,938,913 B2 * | 3/2021 | Dahlstrom | H04L 67/125 |
| 10,966,004 B2 | 3/2021 | Menoher | |
| 11,108,127 B2 * | 8/2021 | Koya | H05K 1/0243 |
| 11,463,444 B2 | 10/2022 | Stephens et al. | |
| 11,734,420 B2 * | 8/2023 | Pasricha | G06F 21/71 726/23 |
| 2005/0033990 A1 | 2/2005 | Harvey et al. | |
| 2010/0211705 A1 | 8/2010 | Alcouffe et al. | |
| 2010/0235561 A1 | 9/2010 | Goldring | |
| 2010/0257353 A1 | 10/2010 | Cheng | |
| 2010/0290476 A1 | 11/2010 | Brindle et al. | |
| 2011/0153969 A1 | 6/2011 | Petrick | |
| 2011/0208963 A1 | 8/2011 | Soffer | |
| 2013/0117556 A1 | 5/2013 | Coleman et al. | |
| 2013/0117995 A1 | 5/2013 | Sullivan et al. | |
| 2015/0039787 A1 | 2/2015 | Voorhees et al. | |
| 2016/0043549 A1 | 2/2016 | Beauregard et al. | |
| 2016/0294826 A1 | 10/2016 | Han et al. | |
| 2016/0366179 A1 | 12/2016 | Coleman et al. | |
| 2017/0118123 A1 | 4/2017 | Ishii et al. | |
| 2017/0346851 A1 | 11/2017 | Drake | |
| 2018/0048674 A1 | 2/2018 | Black et al. | |
| 2018/0062825 A1 | 3/2018 | Miao et al. | |
| 2018/0270956 A1 | 9/2018 | Kimura | |
| 2019/0349747 A1 | 11/2019 | Dunn et al. | |
| 2020/0143085 A1 | 5/2020 | Cooner | |
| 2020/0382521 A1 | 12/2020 | Kursawe et al. | |
| 2021/0067488 A1 | 3/2021 | Gremaud et al. | |
| 2021/0367972 A1 | 11/2021 | Lee et al. | |
| 2021/0367973 A1 | 11/2021 | Lee et al. | |
| 2022/0311517 A1 * | 9/2022 | Nielsen | H05K 1/181 |

OTHER PUBLICATIONS

PCT/US2022/053525 Written Opinion of the International Searching Authority, dated Sep. 8, 2023, 7 pages.

"The Definitive Guide to Data Diode Technologies From Simple to State of the Art." Owl Cyber Defense Solutions, LLC, 2018.

Advenica AB. "SecuriCDS® DD1000i; Unidirectional data flow." Product Sheet, Doc. No. 17235v1.1. (2017).

Advenuca AB. "SecuriCDS® DD1000A; Unidirectional protection for Ethernet layer 2." Product Sheet, Doc. No. 17237v2.1 (2018).

International Search Report dated Feb. 13, 2019 in counterpart International Application No. PCT/US2018/066328.

WIPO, "International Search Report for PCT/US2021/031666," dated Jun. 23, 2021, 4pgs.

WIPO, "Written Opinion of International Searching Authority for PCT/US2021/031666," dated Jun. 23, 2021, 7 pgs.

* cited by examiner

ONE-WAY COMMUNICATION DATA DIODE ON A CHIP

CROSS-REFERENCE TO RELATED APPLICATION

This Patent Application is a continuation of U.S. patent application Ser. No. 18/068,316, entitled "One-Way Communication Data Diode on a Chip," filed Dec. 19, 2022. The disclosure of the prior application is considered part of and is incorporated by reference into this Patent Application.

TECHNICAL FIELD

The present invention relates to the field of security, and in particular to a compact network device on a chip that provides hardware-enforced one-way data transfer from a protected data source.

BACKGROUND ART

Computer and network security is an area of considerable concern. While there is great interest in being able to remotely monitor resources such as industrial facilities across computer networks, lack of security of those monitored resources has required the development of specialized devices that provide defenses against security threats to computers, networks, and other devices in the monitored resources that go beyond the protection of firewalls and other traditional Internet security software and hardware systems. For high-security resources, such as those used by government agencies and some commercial facilities, such as computer-controlled industrial facilities, energy, or water utilities, conventional firewall and other security systems may not provide reliable enough protection from undesired intrusions.

Today, we consider one single, high-value asset to be critical because to lose it would cause widespread disruption (for example, a power plant), but in aggregate, thousands of pieces of commercial equipment represent a similar threat and the number of attack vectors is exponentially higher. Widespread cyberattacks on commercial or "subcritical" equipment, from building chillers to sewage pumps, would cause economic disruption and compromise public safety. For example, attacks on the air handlers in a region's hospital network, the refrigeration equipment at pharmacies and grocery stores, or a nationwide network of electric vehicle charging stations would cause significant harm.

For these types of resources, one-way data transfer may be a critical requirement to isolate the protected network from intrusion by malware or other malicious actors outside the protected network. While conventional Internet firewalls and software systems such as specially configured operating systems may be designed to restrict data transfer to unidirectional data flow, software-based one-way data transfer systems are difficult to validate and verify, and may be subject to intentional or inadvertent misconfiguration that may allow data leakage or intrusions in the reverse direction.

Malicious attacks to date have focused largely on data theft or network disruption, but attacks on physical assets are becoming more frequent. Attackers can compromise Internet of Things (IoT) devices and, for example, (a) Recruit devices into botnets used for distributed denial of service (DDOS) attacks; (b) Open a back door into a corporate network; or (c) Change the operating behavior of the device, leading to device failure or safety concerns.

Data diode devices (also known as one-way communication devices) have been developed to provide hardware-enforced one-way data transfer, using techniques as simple as severing the receive pin in an RS-232 cable to more complex techniques involving the use of optical cables or opto-isolator components that transfer electrical signals between two isolated circuits with light. An opto-isolator (also called an optocoupler) uses an optical emitter such as an LED that generates light responsive to electrical signals, while an optical sensor such as a phototransistor receives the light and converts the light into electrical signals. Because there is electrical isolation between the two sides of the opto-isolator, this physically enforces one-way communication across the opto-isolator.

However, because common Internet protocols depend upon two-way communication, a data diode requires additional components beyond an opto-isolator (or a simple serial cable with the receive line interrupted) to allow effective one-way communication.

Traditional data diodes are used to protect critical infrastructure, such as nuclear reactors or oil refineries by broadcasting equipment status in a one-way manner. These traditional data diodes are expensive and have required customization by skilled implementation teams.

BRIEF DESCRIPTION OF DRAWINGS

The accompanying drawings, which are incorporated in and constitute a part of this specification, illustrate an implementation of apparatus and methods consistent with the present invention and, together with the detailed description, serve to explain advantages and principles consistent with the invention. In the drawings.

DESCRIPTION OF EMBODIMENTS

Figure 1:
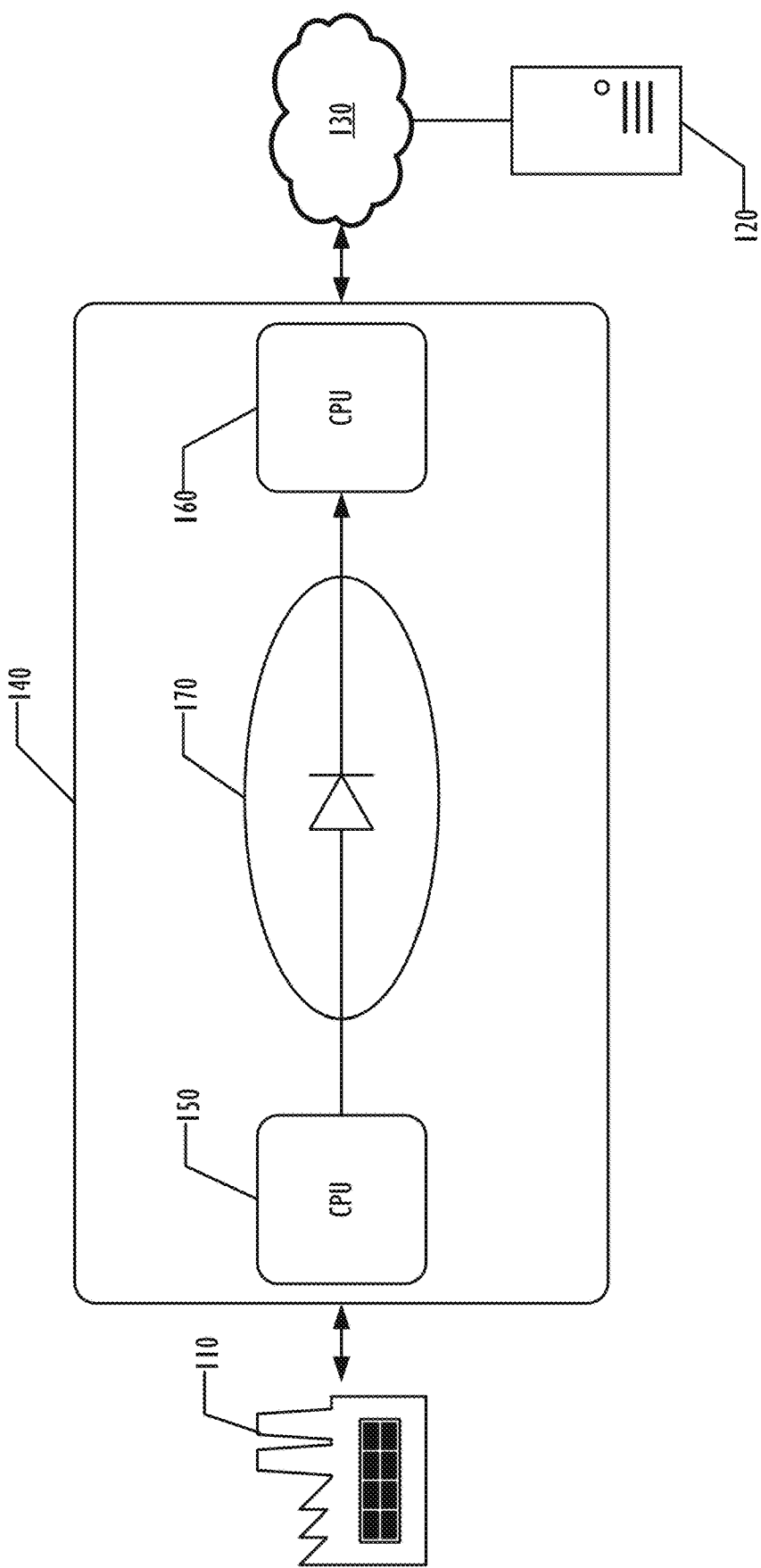
FIG. 1 is a high-level block diagram illustrating a data diode system according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts are understood to reference all instances of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

Although some of the following description is written in terms that relate to software or firmware, embodiments can implement the features and functionality described herein in software, firmware, or hardware as desired, including any combination of software, firmware, and hardware. References to daemons, drivers, engines, modules, or routines should not be considered as suggesting a limitation of the embodiment to any type of implementation. The actual specialized control hardware or software code used to implement these systems or methods is not limiting of the implementations. Thus, the operation and behavior of the systems and methods are described herein without reference to specific software code with the understanding that software and hardware can be used to implement the systems and methods based on the description herein As used herein, satisfying a threshold may, depending on the context, refer to a value being greater than the threshold, greater than or equal to the threshold, less than the threshold, less than or equal to the threshold, equal to the threshold, or the like, depending on the context.

Although particular combinations of features are recited in the claims and disclosed in the specification, these combinations are not intended to limit the disclosure of various implementations. Features may be combined in ways not specifically recited in the claims or disclosed in the specification.

Although each dependent claim listed below may directly depend on only one claim, the disclosure of various implementations includes each dependent claim in combination with every other claim in the claim set. No element, act, or instruction used herein should be construed as critical or essential unless explicitly described as such.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

As used herein, the term "a computer system" can refer to a single computer or a plurality of computers working together to perform the function described as being performed on or by a computer system.

In this description, the term "couple" or "couples" means either an indirect or direct wired or wireless connection. Thus, if a first device couples to a second device, that connection may be through a direct connection or an indirect connection via other devices and connections. The recitation "based on" means "based at least in part on." Therefore, if X is based on Y, X may be a function of Y and any number of other factors.

As used herein, the term "processing element" can refer to a single hardware processing element or a plurality of hardware processing elements that together may be programmed to perform the indicated actions. The hardware processing elements may be implemented as virtual hardware processing elements of a virtual programmable device hosted on a physical hardware device. Instructions that when executed program the processing element to perform an action may program any or all of the processing elements to perform the indicated action. Where the processing element is one or more multi-core processors, instructions that when executed program the processing element to perform an action may program any or all of the multiple cores to perform the indicated action.

As used herein, the term "malware" can refer to any software used to disrupt the operation of a programmable device, gather sensitive information, or gain access to private systems or networks. Malware includes computer viruses (including worms, Trojan horses, etc.), Bots, ransomware, spyware, adware, scareware, and any other type of malicious program.

As used herein, the term "medium" can refer to a single physical medium or a plurality of media that together store the information described as being stored on the medium.

As used herein, the term "memory" can refer to a single memory device or a plurality of memory devices that together store the information described as being stored on the medium. The memory may be any type of storage device, including random access memory, read-only memory, optical and electromechanical disk drives, etc.

A system on chip (SoC) design for a data diode integrated circuit as disclosed below provides several useful advantages over current multi-component data diode technology and offer the ability to use data diodes in a broader set of applications in IoT devices, including autonomous vehicles. Among these advantages are (1) the ability to deploy data diode protection on legacy or new device designs without needing to redesign such devices to accommodate one-way communications; (2) the ability to deploy data diode protection in applications where size and weight are of concern; (3) the ability to standardize interconnection among different types of devices and circuit boards within a manufacturer's product line or across product categories from different providers; and (4) the ability to simplify circuit board designs and reduce the number of pins needed. These advantages are not exclusive but are illustrative and by way of example only. One skill in the art will recognize that other advantages and uses for a data diode on a chip exist.

FIG. 1 is a block diagram illustrating the use of a data diode according to one embodiment. In this example, a data source 110, such as a factory or other protected facility, is to provide data to a destination 120, such as a monitoring server. In some implementations, either or both of the source 110 and destination 120 may be directly connected to the data diode 140, or may be connected to the data diode 140 by one or more networks, such as the cloud network 130 illustrated FIG. 1. Although a single source 110 and a single destination 120 are illustrated in FIG. 1 for clarity of the drawing, the data diode 140 may support one-way communications from multiple sources 110 and multiple destinations 120 as desired. In the example illustrated in FIG. 1, the source is directly connected to the data diode 140 and connected to destination 120 that is a server connected via a cloud network 130; however, the data diode 140 may be connected at the source to any type of equipment, directly or indirectly, with or without an intervening network of any type. Similarly, the data diode 140 may be connected at the destination to any type of equipment, directly or indirectly, with or without an intervening network of any type.

Data diode 140 provides assurance that the data provided by source 110 is sent one-way only, physically preventing data from the destination 120 or elsewhere from reaching source 110. Data diode 140 generally comprises an onboard processing element 150 that communicates with source 110, an onboard processing element 160 that communicates with cloud 130, and a one-way coupler 170 that physically ensures that data passes only from processing element 150 to processing element 160, and not from processing element 160 to processing element 150. Processing elements 150 and 160 are programmed to allow the same data diode 140 to work with any of multiple protocols on either the source or destination side of the data diode, allowing a single model of the data diode 140 to be used in various environments without major configuration effort to accommodate various protocols.

Because the data diode 140 is implemented on a chip, it can be embedded into equipment at the source 110 instead of being manufactured into a separate device. Alternately, the data diode 140 may be manufactured as a separate device that is connected to equipment at the source 110 but provided in a small form factor device, making placement easier than with larger data diodes that have been used previously.

Figure 2:
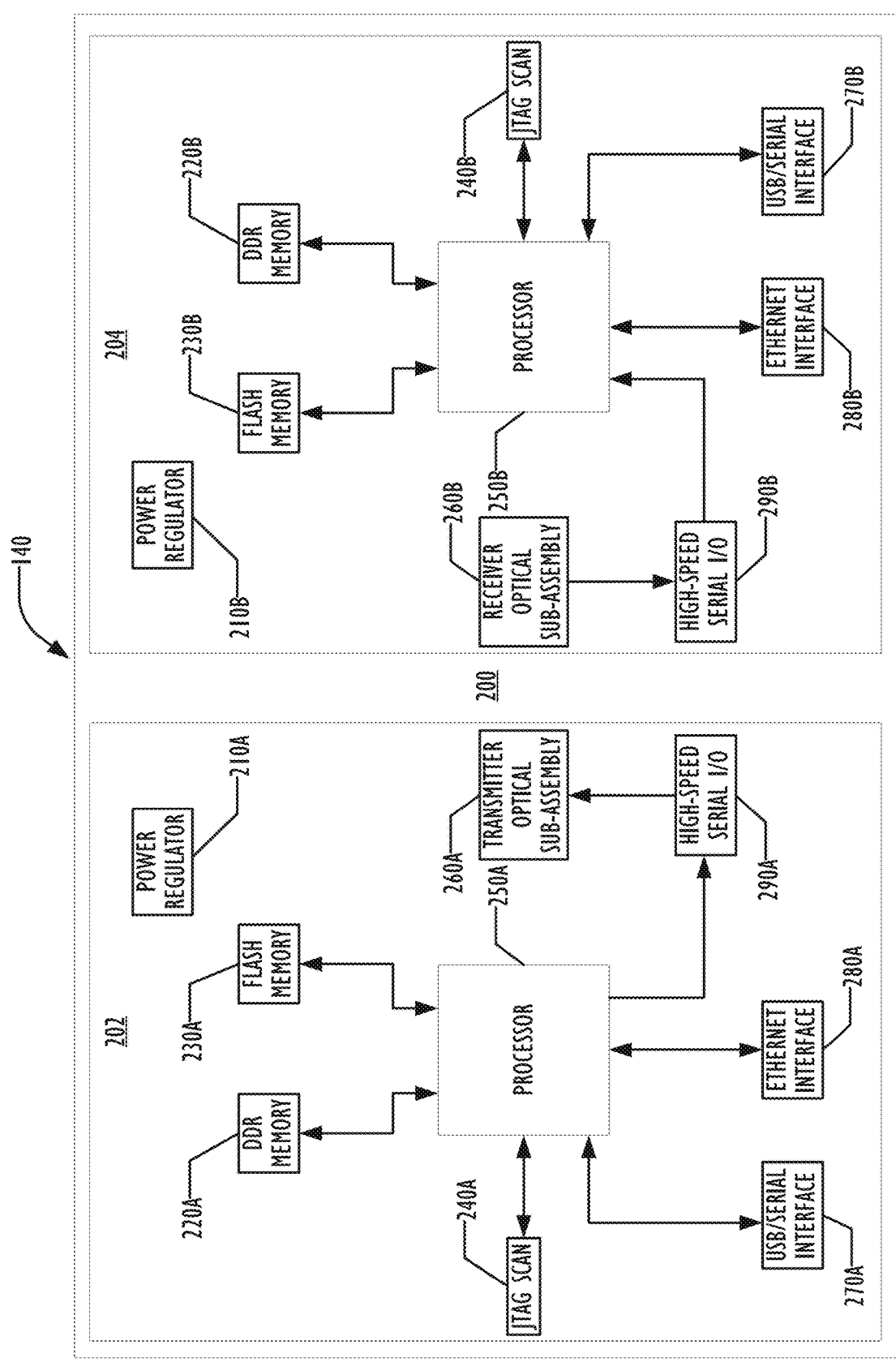
FIG. 2 is a block diagram illustrating components of a data diode according to one embodiment.

FIG. 2 is a block diagram illustrating an example layout of the components of data diode 140 according to one embodiment. In this figure, certain common elements have been omitted for clarity of the drawing, but one of skill in the art would understand that those elements would be present in an operable embodiment. Connections are illustrated as logical connections between elements, and one of skill in the art would understand that connections between elements in the figure may involve multiple electrical traces instead of the single connector used to illustrate the connections between elements in the figure.

In the discussion that follows, the onboard elements are assembled into a microelectromechanical system (MEMS). MEMS is a process technology that is used to create tiny integrated devices or systems that combine mechanical and electrical components. MEMS devices are fabricated using integrated circuit (IC) batch processing techniques, starting with a foundational substrate wafer (typically of silicon or glass) and then built up and sculpted through subsequent steps of adding material layers through deposition, patterning the surface through masks and photolithography, and subtracting unwanted sections via etching. MEMS fabrication techniques are known to the art and need not be further described herein.

In one embodiment, a substrate 200, typically made of silicon, may provide a base for mounting and connecting various components on a single MEMS chip. Although identified as separate components by their function, one of skill in the art would understand that components illustrated as separate components may be combined into integrated components and that components illustrated as a single component may be split into separate components as desired. In addition, other components not illustrated in the Figures may be included in the chip design if desired. For example, an Ethernet controller might be included in the chip design, instead of being external to the chip.

Off-chip connections, including both power and data communication connections, are typically made using metal pin connectors that provide electrical connections to the circuits contained on-chip. These pins and the circuit traces from the pins to the various components contained on-chip are omitted from the drawings for clarity.

The data diode 140 is comprised of two portions 202 and 204 that communicate with each other in a one-way manner across one or more one-way data bridges that enforce one-way communication. Although part of a single chip, the two sides of the chip are electrically isolated because there are no electrical connections between portion 202 and portion 204. The only way for information to pass between circuit elements in portion 202 to circuit elements in portion 204 is via the transmitter and receiver optical sub-assemblies 260A and 260B, which are described in more detail below. Preferably, each of portions 202 and 204 provides independent ground planes for the input and output side of the data diode 140. However, the data diode 140 could be manufactured with a common ground, at the cost of some decrease in security. Thus, the data diode 140 physically prohibits data from flowing from the processing element 250B to the processing element 250A.

As illustrated in FIG. 2, a transmitter optical sub-assembly 260A and a receiver optical sub-assembly 260B provide a one-way data bridge between two processing elements 250A and 250B, with the transmitter optical sub-assembly 260A transmitting information from processing element 250A to receiver optical sub-assembly 260B for providing to processing element 250B. Although illustrated as providing one-way communication from processing element 250A to processing element 250B, other embodiments may be manufactured to provide a secure reverse channel, similar to that described in U.S. Pat. No. 11,153,345, "One-Way Transfer Device with Secure Reverse Channel," which is incorporated herein by reference in its entirety for all purposes.

In one embodiment, the transmitter optical sub-assembly 260A may comprise a laser diode, an optical interface, a monitor photodiode, and an electrical interface. The purpose of the transmitter optical sub-assembly 260A is to convert an electrical signal into an optical signal. Depending on the required functionality and application, other elements may be included in the transmitter optical sub-assembly, such as filter elements and isolators. The transmitter optical sub-assembly 260A in other embodiments may use different techniques such as elements to convert an electrical signal into an infrared signal.

In one embodiment, the receiver optical sub-assembly 260B may comprise a photodiode, an optical interface, and an electrical interface. The purpose of the receiver optical sub-assembly 260B is to convert an optical signal into an electrical signal. Depending on the required functionality and application, other elements may be included in the receiver optical sub-assembly 260B, such as filter elements and isolators. In an embodiment in which the transmitter optical sub-assembly uses infrared technology, the receiver optical sub-assembly 260B may use infrared elements to convert the infrared signal into an electrical signal.

No other electrical path connects processing elements 250A and 250B. As illustrated in FIG. 2, each "side" of the data diode 140 may have its own power connection through separate power pins. Although not shown in FIG. 2, preferably each portion of the data diode 140 is implemented with separate grounding pins, further ensuring there is no path for data to traverse the data diode 140 in the reverse direction from the intended direction.

Processing elements 250A and 250B may be any desired type of processing element, including processors and microcontrollers. An example processing element may be an ARM® CORTEX® or another ARM architecture processor from ARM Limited or a third party having an architectural license from ARM Limited. (ARM and CORTEX are registered trademarks of ARM Limited.) Each of the processing elements 250A and 250B must be powerful enough to perform protocol detection and conversion for a plurality of protocols.

In one embodiment, the processing elements 250A and 250B may have a 3-port 10/100/1000 Ethernet Media Access Control (MAC), a Double Data Rate 4 (DDR4) or Low-Power DDR 4 (LPDDR4) interface, an embedded MultiMediaCard (eMMC) interface, a Controller Area Network (CAN) interface, a Universal Serial Bus (USB) interface, a Serializer/Deserializer (SERDES) interface, a Universal Asynchronous Receiver Transmitter (UART)

interface, a Serial Peripheral Interface (SPI), and an Inter-Integrated Circuit (I2C) interface. The processing elements 250A and 250B may have a Security Hardware Accelerator, as well as cryptography, debug security, secure boot, and trusted execution environment capabilities, as well as a Secure-IC IP core to protect against a variety of different attacks. The processing elements 250A and 250B may support various networking protocols, such as Ethernet, EtherCAT, Ethernet/Industrial Protocol (Ethernet/IP), Integrated Control and Safety Systems (ICSS), Process Field Network (PROFINET), and Time-Sensitive Networking (TSN). The processing element may also contain at least 2 megabytes of random access memory (RAM). The operating system that executes on the processing elements 250A and 250B may be any desired operating system, such as LINUX®, ANDROID®, or Real-Time Operating System (RTOS). (LINUX is a registered trademark of Linus Torvalds. ANDROID is a registered trademark of Google LLC.)

Each of processing elements 250A and 250B may be programmed with firmware code to perform protocol manipulation to allow the processing elements 250A and 250B to recognize a communication protocol used by the source 110 and destination 120, and process the communication in a way that successfully allows the one-way communication, even if either or both of the communication protocols used by the source 110 or destination 120 require two-way communication. In such a scenario, one or both of processing elements 250A and 250B may communicate in a two-way communication with the source 110 or destination 120 to which the processing element 250A or 250B is connected, acting as a proxy while performing one-way communication across the transmitter optical sub-assembly 260A and receiver optical sub-assembly 260B between processing elements 250A and 250B. In some embodiments, the communication protocol used to communicate between processing elements 250A and 250B may differ from either or both of the communication protocols used by source 110 and destination 120. Preferably, the processing elements 250A and 250B are programmed to recognize the communication protocols used by source 110 and destination 120 automatically, allowing the data diode 140 to be coupled between source 110 and destination 120 without manual configuration by the user or with minimal configuration as desired. Processing elements 250A and 250B may contain onboard memory for storing the firmware used for operating the processing elements 250A and 250B in some embodiments. In other embodiments, flash memory elements 230A and 230B may be used for storing firmware for the processing elements 250A and 250B, respectively.

Power regulators 210A and 210B provide power to the processing elements 250A and 250B and the rest of the data diode 140. In one embodiment, the power regulator provides 1.2V, 1.8V, and 3.3V power. In some embodiments, power regulation is provided by off-chip connected components, instead of being on-chip.

Memory elements 220A and 220B provide memory for use by the processing elements 250A and 250B. Typically, memory elements 220A and 220B are DDR type memory, but other types of memory may be used if desired. In one embodiment, the memory elements 220A and 220B may support DDR4 memory types up to DDR 1600. Although illustrated in FIG. 2 as a single connector for clarity reasons, the memory elements 220A and 220B may be connected to the processing elements 250A and 250B by a 32-bit data bus and a 7-bit single error correction double error detection (SECDED) bus. Embodiments of the memory elements 220A and 220B may provide 8 GB or more of total addressable space.

Flash memory elements 230A and 230B use a Secure Digital Multimedia Card (SDMMC) interface that is compliant with the Secure Digital (SD) standard and the JEDEC® embedded Multimedia Card (eMMC) standard. (JEDEC is a registered trademark of JEDEC Solid State Technology Association.)

JTAG boundary scan elements 240A and 240B enable the boundary scan elements to be used for a wide variety of applications, including system-level testing, memory testing, and flash programming according to the standard codified by the Joint Test Action Group.

The Universal Serial Bus (USB)/Serial Interface elements 270A and 270B provide an interface for communicating between the data diode 140 and the source 110 or destination 120. Preferably, the USB/Serial Interface elements 270A and 270B support at least USB 3.0 with an integrated physical layer (PHY) and support for low speed (LS), full speed (FS), and high speed (HS) signaling rates, as well as a USB 2.0 HighSpeed subsystem that supports an integrated LS/FS/HS PHY. Other high-capability USB interfaces can be used if desired.

Ethernet interfaces 280A and 280B provide Ethernet communications with the processing elements 250A and 250B. A three-port Gigabit Ethernet MAC subsystem provides Ethernet packet communication for the data diode 140. The Ethernet interfaces 280A and 280B may include a Reduced Gigabit Media Independent Interface (RGMII), a Reduced Media Independent Interface (RMII), and a Management Data Input/Output (MDIO) interface for PHY management.

High-speed serial input/output (I/O) blocks 290A and 290B are functional blocks that are used in high-speed communications to convert data between serial data and parallel interfaces in each direction. High-speed serial I/O block 290A receives data from the processing element 250A and provides it to the transmitter optical sub-assembly 260A for secure transmittal to the receiver optical sub-assembly 260B. High-speed serial I/O block 290B then receives the data from the receiver optical sub-assembly 260B and provides it to the processing element 250B, which can then transmit the data to the destination 120. High-speed serial I/O block 290A uses a Parallel In Serial Out (PISO) block, also known as a parallel to serial converter, and high-speed serial I/O block 290B uses a Serial In Parallel Out (SIPO) block, also known as a serial to parallel converter. Thus, data from the source 110 is received by the processing element 250A, converted to serial data for optical transmission then converted back to parallel data for providing to the processing element 250B for transmittal to the destination 120. To this end, serializer (SERDES) elements of the high-speed serial I/O blocks 290A and 290B contain a variety of functional blocks to handle both the external analog interface as well as the internal digital logic required for the high-speed serial I/O blocks 290A and 290B to function.

Unlike a data diode that is implemented as a standalone device, connectors for connecting the source 110 and destination 120 are off-chip in the data diode 140 of FIG. 2. These connectors may be of any desired type supported by the USB/Serial Interfaces 270A and 270B and Ethernet interfaces 280A and 280B. The connectors used to connect to the input side of the data diode 140 may be different from the connectors used to connect to the output side of the data diode 140.

In one embodiment, different elements may be used for each "side" of the data diode 140. For example, the USB/Serial Interface 270A may be of a different type than the USB/Serial Interface 270B or the processing element 250A may be a different type than the processing element 250B.

Each of processing elements 250A and 250B may include memory and firmware loaded into the memory for the operation of the processing elements. The firmware comprises firmware to allow each of the processing elements 250A and 250B to act as a proxy for the source 110 or destination 120 and to manage the one-way communication between them even though either or both source 110 and destination 120 communicate with the data diode 140 using two-way communication protocols.

In various embodiments, the firmware loaded into memory on the processing elements 250A and 250B for converting two-way communication to one-way communication may be implemented on one or both processing elements 250A and 250B. Embodiments may include firmware that detects the protocol used by source 110 or destination 120 and loads an appropriate conversion firmware module to convert the protocol used by source 110 or destination 120 into a one-way protocol for communicating between the processing elements 250A and 250B. Communication between the processing elements 250A and 250B may be performed according to a standard one-way communication protocol or may be performed in some embodiments using a non-standard one-way protocol specifically designed for the data diode 140. For example, processing element 250A may detect a connection to source 110 that uses a TCP protocol and convert the TCP protocol into a UDP protocol for communicating with the processing element 250B, which may then reconvert the UDP protocol into a TCP protocol for communicating with destination 120.

In one embodiment, processing elements 250A and 250B are preprogrammed with a plurality of protocol detection and conversion modules, allowing the data diode 140 to be placed into operation in a variety of environments without the need for pre-configuration. In some embodiments, because of the presence of a plurality of types of connectors on both the input and output sides of the data diode 140, the data diode 140 can be used with a connector to the source 110 of one type and a connector to the destination 120 of a different type. In some embodiments, control firmware may sequence between a predefined set of pre-loaded control protocols, such as BACnet, LonTalk, Modbus, DNP3, etc.) and determine what variables may be provided by the source 110, such as run time, system on/off status, temperature, fan speed, etc., and the processing element 250A or 250B may report those metrics across the optocoupler 205 at a predetermined interval or upon changes of the relevant metric. Similarly, in some embodiments, control firmware may sequence between a predefined set of pre-loaded control protocols for communicating with the destination. In some embodiments, one or more of processing elements 250A and 250B may encrypt the data received from the source 110 for delivery in encrypted form to destination 120, further enhancing the protection of the data from the source 110. Such encryption may be performed using any desired encryption technique, including symmetric and asymmetric encryption techniques.

In some embodiments, the source side processing element 250A or 250B may attempt to communicate using a preprogrammed sequence of queries until it has determined what protocols the source 110 uses and what variables the source 110 can report.

The arrangement of components on the substrate 200 of FIG. 2 is illustrative and by way of example only, and other arrangements can be used as desired.

Although preferably preconfigured to be plugged in and automatically activated, some embodiments may allow configuration of the data diode 140 at the installation site or elsewhere prior to operation. In some embodiments, the data diode 140 is not configurable on-site. In some embodiments, any type of wired or wireless connection technique may be used to connect the data diode 140 to another device, such as a mobile device with an appropriate app, for in-field setup or management of the data diode 140 and for collecting information from the data diode 140 regarding its operation. A geolocation block (not shown in FIG. 2) may be incorporated in some embodiments to allow the data diode 140 to report its location as geolocation coordinates based on geolocation data from a global satellite-based navigation system or other geolocation data providers.

Although described above in terms of wired interfaces to the data diode 140, wireless interfaces may be implemented. For example, outbound connectivity may be provided by an outbound communication interface that comprises a cellular modem and an antenna for communicating with a cellular network, such as is described in U.S. Pat. No. 10,474,613, entitled "ONE-WAY DATA TRANSFER DEVICE WITH ONBOARD SYSTEM DETECTION," which is incorporated herein in its entirety for all purposes.

Other types of wireless communication components may be deployed in various embodiments allowing for non-cellular wireless communication with either or both the inbound and outbound side of the data diode 140, in addition to or instead of cellular or wired connectivity. For example, wireless components can be deployed for WI-FI©, Bluetooth©, LORA®, satellite, ZIGBEE®, and ZWAVE communications, and any other desired type of wireless communications. (WI-FI is a registered trademark of WiFi Alliance; Bluetooth is a registered trademark of Bluetooth SIG, Inc.; LORA is a registered trademark of Semtech Corporation; ZIGBEE is a registered trademark of ZigBee Alliance; Z-WAVE is a registered trademark of Silicon Laboratories, Inc.) Any combination of any of the wired or wireless (including cellular) communication techniques may be provided on either the inbound or outbound side of the data diode 140.

In some embodiments, the data diode 140 may be configured with reporting firmware to allow a cloud-based data collection, display, and analytics platform to collect usage data from the data diode 140 and allow a user to create custom alerts, detect tampering with the data diode 140, and receive recommended actions drawn from predictive analytics.

Figure 4:
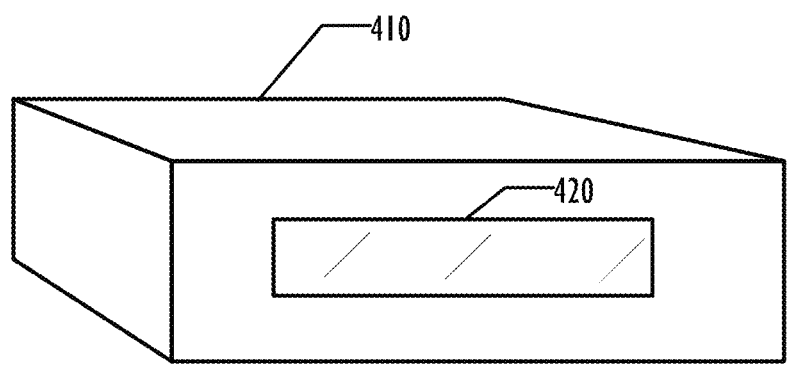
FIG. 4 is a perspective view of a housing for the data diode system according to one embodiment.

In an implementation where the data diode 140 is mounted in a standalone data diode device, the substrate 200 and the components disposed thereon, as well as off-chip components such as connectors, are typically mounted on a printed circuit board that is housed in a protective housing 410 as illustrated in FIG. 4, which may be of any desired shape and configuration. For example, the data diode 140 may be housed in a 1 U form factor case for mounting in a standard rack. In some embodiments, a transparent window 420 may allow viewing LEDs or other indicators that may be connected to the data diode 140 chip to indicate the state of the data diode 140. Some embodiments may provide a housing 410 that employs tamper-resistant techniques to prevent or detect tampering with the data diode 140. In some embodiments, a plurality of data diodes 140 may be housed in a common housing 410 to act as channels for separate communication paths, where a plurality of links are desired between a single source 110 and a single destination 120, a single source 110 and a plurality of destinations 120, a plurality of sources 110 and a single destination 120, or a plurality of sources 110 and a plurality of destinations 120.

In other implementations where the data diode 140 is embedded in another device, the substrate 200 and the components disposed thereon, as well as off-chip components such as connectors may be mounted on one or more printed circuit boards of the other device as convenient or desired.

The processing element 250A may be pre-programmed to take predetermined actions upon detecting corresponding conditions, such as the detection of a network anomaly. Those predetermined actions may include interruption of the network data flow, injecting data into the network data flow, or transmitting information or commands to the source 110.

Figure 3:
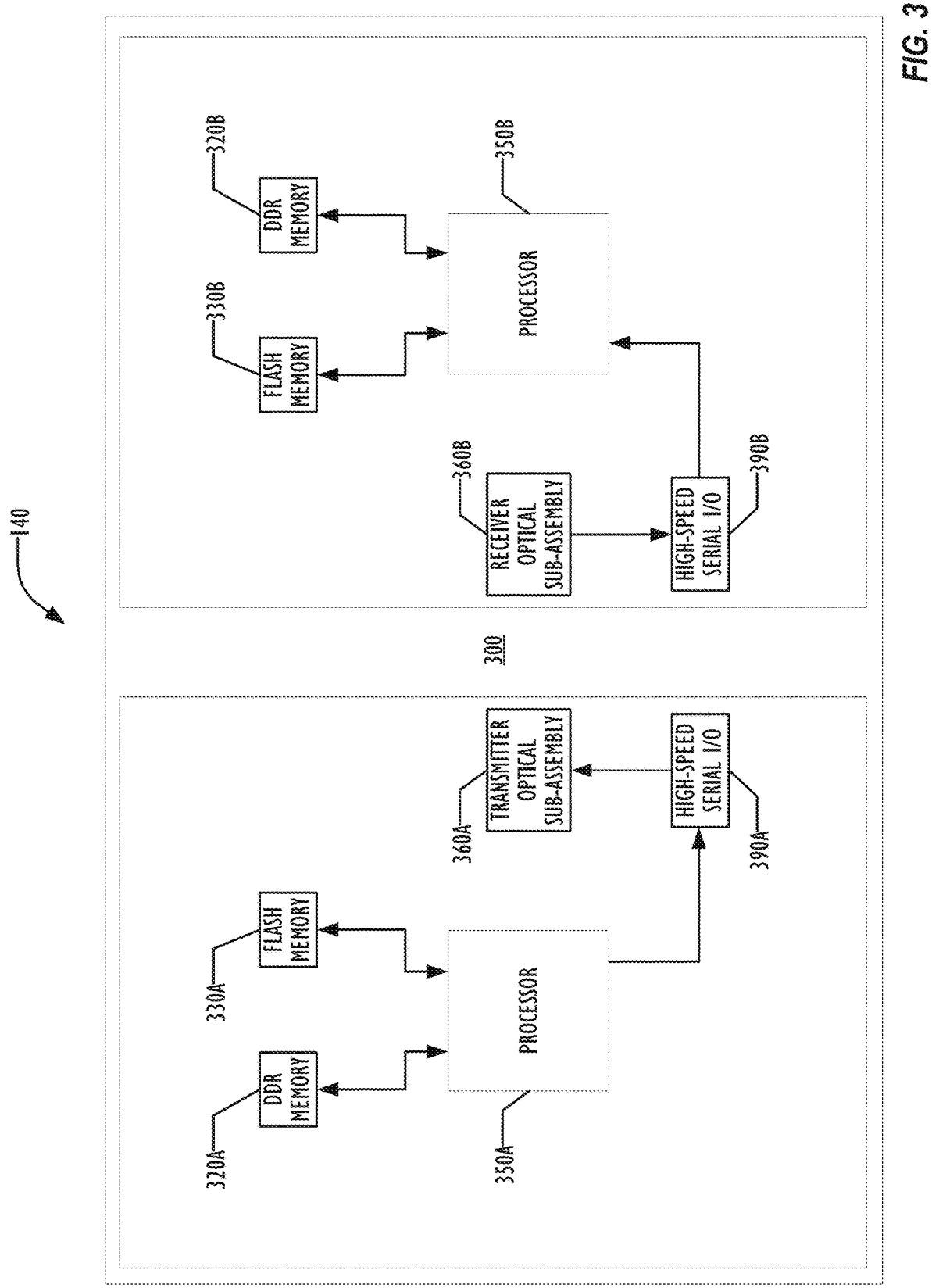
FIG. 3 is a block diagram illustrating components of a data diode according to another embodiment.

FIG. 3 is a block diagram illustrating an alternate embodiment of a data diode 140, in which some of the on-chip blocks of the embodiment illustrated in FIG. 2 are provided off-chip, simplifying the design of the chip for the data diode 140. In this example, the input side of the data diode 140 implemented on-chip comprises a processor 350A, a DDR memory 320A, a flash memory 330A, a high-speed serial I/O interface 390A, and a transmitter optical sub-assembly 360A. Similarly, the output side of the data diode 140 in this example comprises a receiver optical sub-assembly 360B, a high-speed I/O interface 390B, a processing element 350B, a flash memory 330B, and a DDR memory 320B. Other embodiments may include any other combination of the elements of FIG. 2 added to the basic elements of FIG. 3. The selection of components to be implemented off-chip described above is not intended to be limiting, and one of skill in the art will recognize that other combinations of elements may be on-chip and off-chip as desired.

While certain example embodiments have been described in detail and shown in the accompanying drawings, it is to be understood that such embodiments are merely illustrative of and not devised without departing from the basic scope thereof, which is determined by the claims that follow.

We claim:

1. A data diode on a chip, comprising:
   a substrate for the chip comprising a first portion and a second portion;
   an input side disposed on a first portion of the substrate, comprising:
   a first processing element;
   a transmitter optical sub-assembly, coupled to the first processing element; and
   an output side disposed on a second portion of the substrate, comprising:
   a second processing element; and
   a receiver optical sub-assembly, coupled to the second processing element,
   wherein the transmitter optical sub-assembly and the receiver optical sub-assembly provide a one-way data bridge coupled between the first processing element and the second processing element that allows data flow from the first processing element to the second processing element and physically prohibits data flow from the second processing element to the first processing element.

2. The data diode on the chip of claim 1, wherein data diode on the chip further comprises:
   a first memory connected to the first processing element.

3. The data diode on the chip of claim 2, wherein the first memory is a double data rate memory.

4. The data diode on the chip of claim 1, wherein data diode on the chip further comprises:
   a second memory connected to the second processing element.

5. The data diode on the chip of claim 4, wherein the second memory is a double data rate memory.

6. The data diode on the chip of claim 1, wherein data diode on the chip further comprises:
   a first flash memory connected to the first processing element.

7. The data diode on the chip of claim 1, wherein data diode on the chip further comprises:
   a second flash memory connected to the second processing element.

8. The data diode on the chip of claim 1, wherein the data diode on the chip further comprises:
   a first high-speed serial input/output element connected to the first processing element and the transmitter optical sub-assembly.

9. The data diode on the chip of claim 1, wherein the data diode on the chip further comprises:
   a second high-speed serial input/output element connected to the second processing element and the receiver optical sub-assembly.

10. The data diode on the chip of claim 1, wherein the data diode on the chip further comprises:
    a first boundary scan interface connected to the first processing element.

11. The data diode on the chip of claim 1, wherein the data diode on the chip further comprises:
    a second boundary scan interface connected to the second processing element.

12. The data diode on the chip of claim 1, wherein the data diode on the chip further comprises:
    a first serial interface connected to the first processing element.

13. The data diode on the chip of claim 1, wherein the data diode on the chip further comprises:
    a second serial interface connected to the second processing element.

14. The data diode on the chip of claim 1, wherein the data diode on the chip further comprises:
    a first Ethernet interface connected to the first processing element.

15. The data diode on the chip of claim 1, wherein the data diode on the chip further comprises:
    a second Ethernet interface connected to the second processing element.

16. The data diode on the chip of claim 1, wherein the first portion and the second portion have independent ground planes.

17. The data diode on the chip of claim 1, wherein the first portion and the second portion are electrically isolated.

18. The data diode on the chip of claim 1, further comprising:
    firmware for execution by the first processing element or the second processing element, comprising instructions that when executed cause the first processing element or the second processing element to collect data about usage of the data diode on the chip.

19. A data diode, comprising:
    a housing;
    a printed circuit board, disposed within the housing;
    a data diode chip, mounted on the printed circuit board, comprising:
    a substrate for the chip comprising a first portion and a second portion;

an input side disposed on a first portion of the substrate, comprising:
  a first processing element;
  a transmitter optical sub-assembly, coupled to the first processing element; and
an output side disposed on a second portion of the substrate, comprising:
  a second processing element; and
  a receiver optical sub-assembly, coupled to the second processing element,
wherein the transmitter optical sub-assembly and the receiver optical sub-assembly provide a one-way data bridge coupled between the first processing element and the second processing element that allows data flow from the first processing element to the second processing element and physically prohibits data flow from the second processing element to the first processing element;
a first connector, coupled to the first portion of the data diode chip, configured for communication with a data source; and
a second connector, coupled to the second portion of the data diode chip, configured for communication with a data destination.

20. A data diode component for embedding in a device, comprising:
  a printed circuit board;
  a data diode chip, mounted on the printed circuit board, comprising:
    a substrate for the chip comprising a first portion and a second portion;
    an input side disposed on a first portion of the substrate, comprising:
      a first processing element;
      a transmitter optical sub-assembly, coupled to the first processing element; and
    an output side disposed on a second portion of the substrate, comprising:
      a second processing element; and
      a receiver optical sub-assembly, coupled to the second processing element,
    wherein the transmitter optical sub-assembly and the receiver optical sub-assembly provide a one-way data bridge coupled between the first processing element and the second processing element that allows data flow from the first processing element to the second processing element and physically prohibits data flow from the second processing element to the first processing element;
  a first connector, coupled to the first portion of the data diode chip, configured for communication with a data source; and
  a second connector, coupled to the second portion of the data diode chip, configured for communication with a data destination.

\* \* \* \* \*